(12) United States Patent
Niemi et al.

(10) Patent No.: US 9,039,068 B2
(45) Date of Patent: May 26, 2015

(54) DEPLOYABLE AIR DAM

(71) Applicants: Jeffrey M Niemi, Milford, MI (US); Praveen Joseph John, Chennai (IN)

(72) Inventors: Jeffrey M Niemi, Milford, MI (US); Praveen Joseph John, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/034,041

(22) Filed: Sep. 23, 2013

(65) Prior Publication Data

US 2015/0084369 A1   Mar. 26, 2015

(51) Int. Cl.
*B62D 35/00* (2006.01)
*B62D 35/02* (2006.01)

(52) U.S. Cl.
CPC ..................... *B62D 35/02* (2013.01)

(58) Field of Classification Search
USPC ................. 296/180.1, 180.2, 180.4
See application file for complete search history.

(56) References Cited

U.S. PATENT DOCUMENTS

| 4,159,140 | A  |   | 6/1979 | Chabot et al. |
| 6,079,769 | A  | * | 6/2000 | Fannin et al. ............. 296/180.1 |
| 2010/0140976 | A1 | * | 6/2010 | Browne et al. ............. 296/180.1 |

OTHER PUBLICATIONS

Capstone Design Final Report, Deployable Front Air Deflection System; Michigan Technological University Dept. of Mechanical Engineering; Galbraith et al; Dec. 13, 2010.

* cited by examiner

*Primary Examiner* — Joseph D Pape
(74) *Attorney, Agent, or Firm* — Ralph E Smith

(57) ABSTRACT

A deployable air dam for an automotive vehicle has panel, a plurality of four-bar linkages coupling the panel to a front of the vehicle, and an electric clutched actuator coupled to the four-bar linkages for moving the panel of the air-dam between a deployed and an undeployed position wherein the panel extends vertically down from a bottom of a bumper of the vehicle when in the deployed position.

4 Claims, 3 Drawing Sheets

DEPLOYABLE AIR DAM

FIELD

The present invention relates to air dams for automotive vehicles.

BACKGROUND

Air dams, which are sometimes called spoilers, can be mounted to the lower front bumpers of vehicles such as pick-up trucks to reduce the amount of air passing beneath the vehicle. This reduces aerodynamic drag and helps increase fuel economy.

These air dams are typically relatively rigid. This can result in damage to the air dam due to the bottom of the air dam impacting the road surface, such as may occur when the truck passes over bumps in the road at speed.

SUMMARY

In accordance with an aspect of the present disclosure, a deployable air dam for an automotive vehicle includes a panel, a plurality of four-bar linkages coupling the panel to a front of the vehicle, and an electric clutched actuator coupled to the four-bar linkages for moving the panel of the air-dam between a deployed and an undeployed position wherein the panel extends vertically down from a bottom of a bumper of the vehicle when in the deployed position In accordance with an aspect of the present disclosure, the four-bar linkages couple the panel to a front bumper of the vehicle.

In accordance with an aspect of the present disclosure, the four bar linkages articulate to move the panel of the air dam up and back to its undeployed position and down and forward to its deployed position.

In accordance with an aspect of the present disclosure, the air dam includes an actuator rod coupling the electric clutched actuator to the four bar linkages, the electric clutched actuator releasing the actuator rod when the panel of the air dam hits an object when the vehicle is traveling permitting the panel to move back and up.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
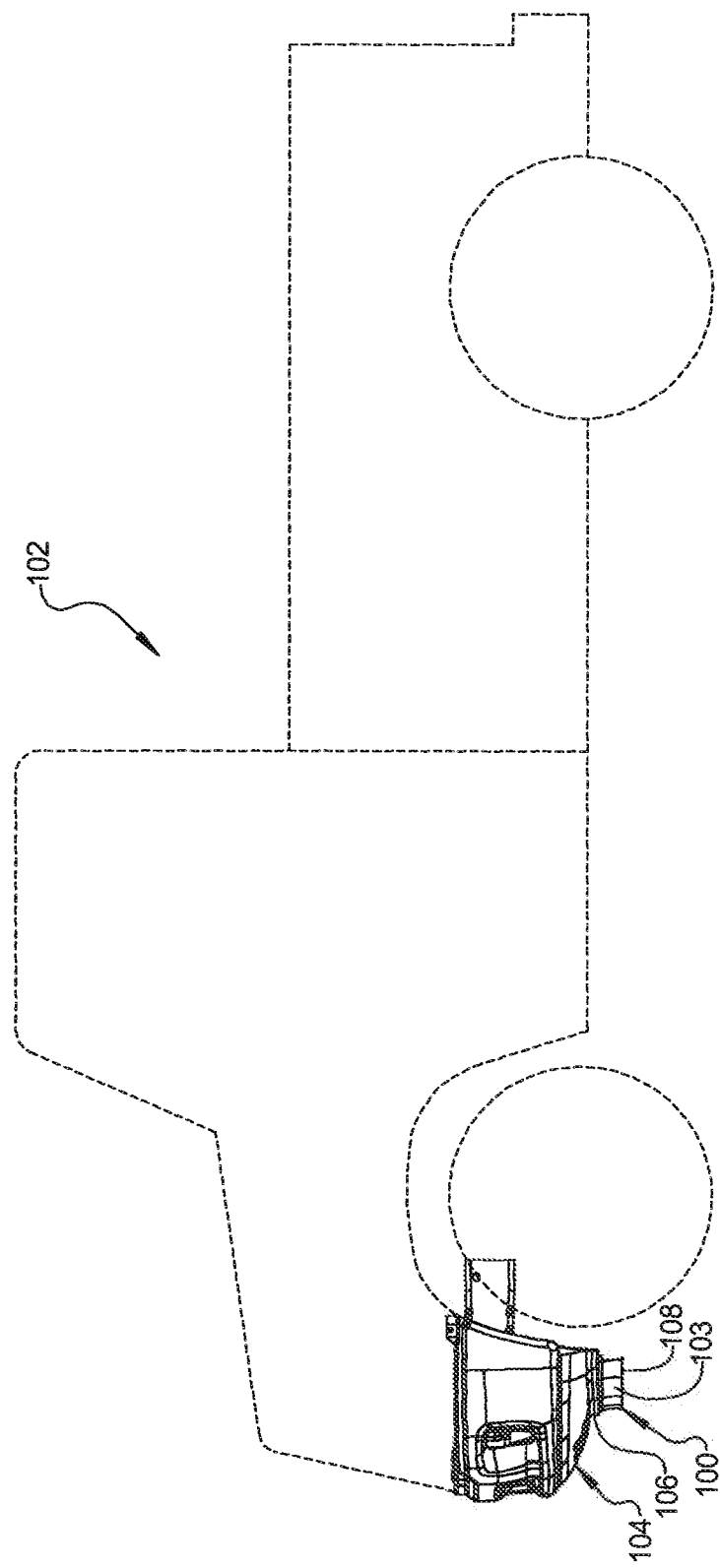
FIG. 1 is a perspective view showing an air dam in accordance with an aspect of the present disclosure on a pick-up truck.

With reference to the drawings, a deployable air dam 100 for an automotive vehicle such as pick-up truck 102 is shown. The air dam 100 is shown in FIG. 1 mounted to a front of the pick-up truck 102, such as to front bumper 104 of the pick-up truck 102. When in the deployed (or down) position, a panel 103 of air dam 100 extends vertically down from a bottom 106 of front bumper 104 to a short distance above a road surface such as of a road on which the pick-up truck is travelling. A lower edge 108 of panel 103 of air dam 100 may for example be about six inches above the road surface when the air dam is deployed. When deployed, air dam 100 thus reduces the ground clearance at the front of the pick-up truck from about eight inches (the gap between the bottom of the bumper and the road surface) to about six inches. Panel 103 may illustratively be a plastic panel and in an aspect, a 2.5-3.0 mm thick panel of nylon and Santoprene. It should be understood that panel 103 could be made of other types of plastics, and could also be made of other materials such as metals. In an aspect, panel 103 is shaped to follow the contour of bumper 104.

Figure 2:
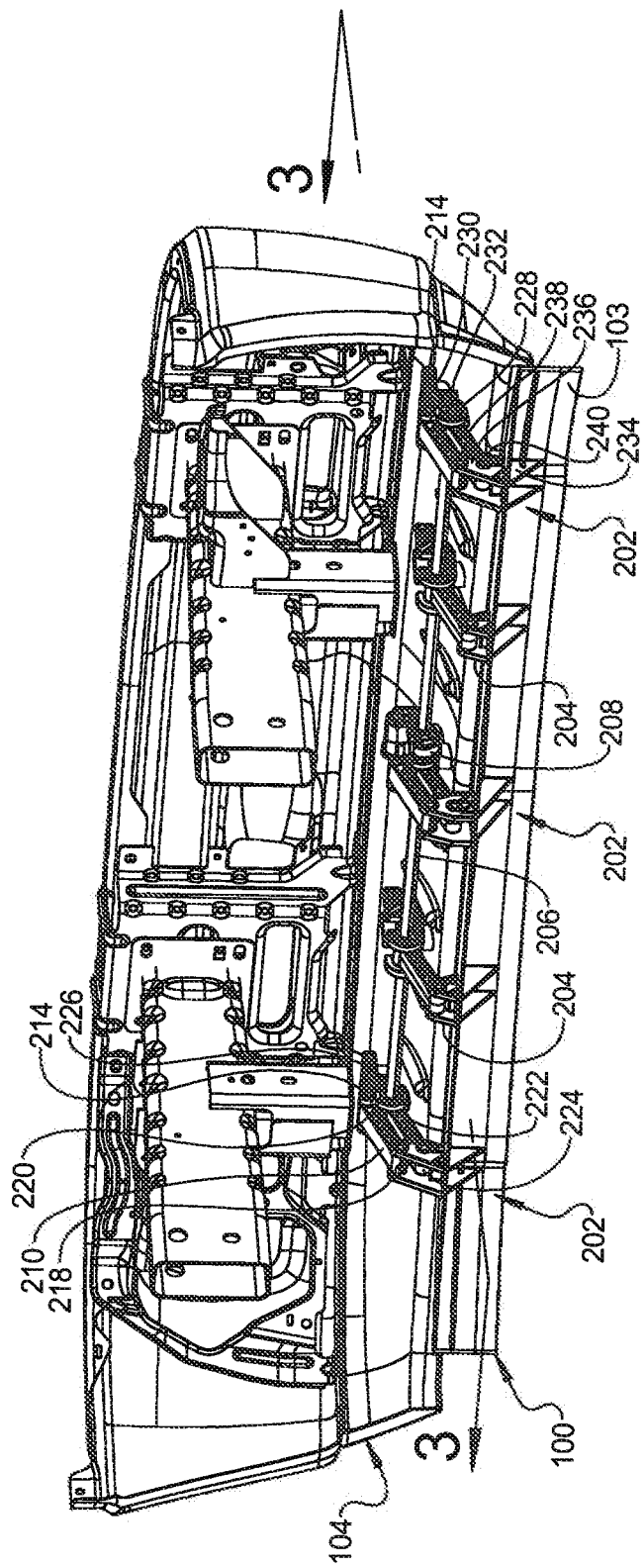
FIG. 2 is a perspective view of the air dam of FIG. 1.

With reference to FIG. 2, panel 103 of air dam extends along bumper 104 and has a width that is approximately the same or slightly less than the width of bumper 104. A plurality of linkages 202 are attached to panel 103 and to bumper 104. Linkages 202 are four-bar linkages as discussed in more detail below. Air dam 100 may also include support linkages 204 discussed in more detail below. An actuator rod 206 is attached to each four-bar linkage 202 and to an electric clutched actuator 208. By electric clutched actuator, it is meant that actuator 208 is an electric actuator having an electric motor and a clutch. Actuator rod 206 is coupled to the clutch. An electric clutched actuator utilized in a proof of concept prototype of air dam 100 was a Powerfold mirror actuator available from Mirror Controls International having a place of business at 14496 S Sheldon Rd, Plymouth, Mich. 48170. It should be understood that a more robust electric clutched actuator would be used in a production version of air dam 100.

Figure 3:
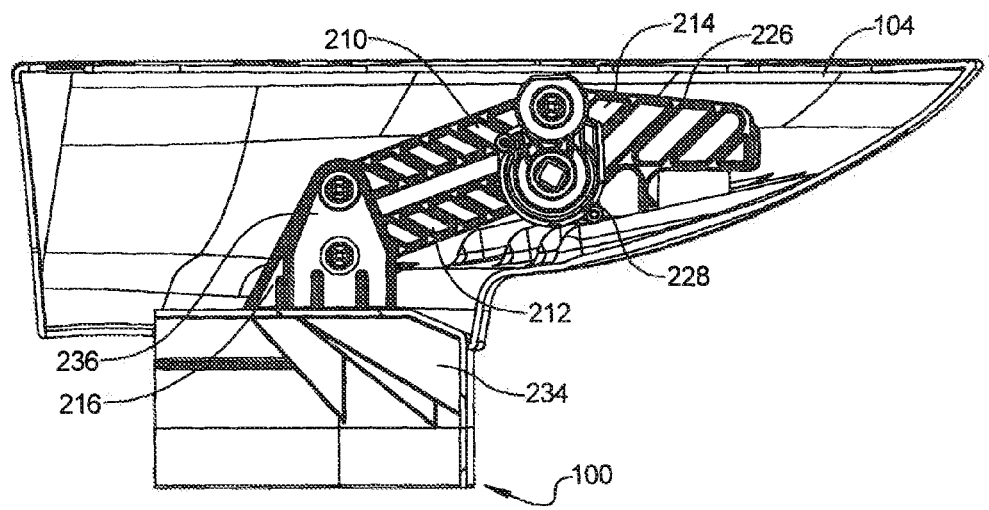
FIG. 3 is a section view of the air dam and pick-up truck bumper of FIG. 1 taken along the line 3-3 of FIG. 2 with the air dam in its deployed position.
Figure 4:
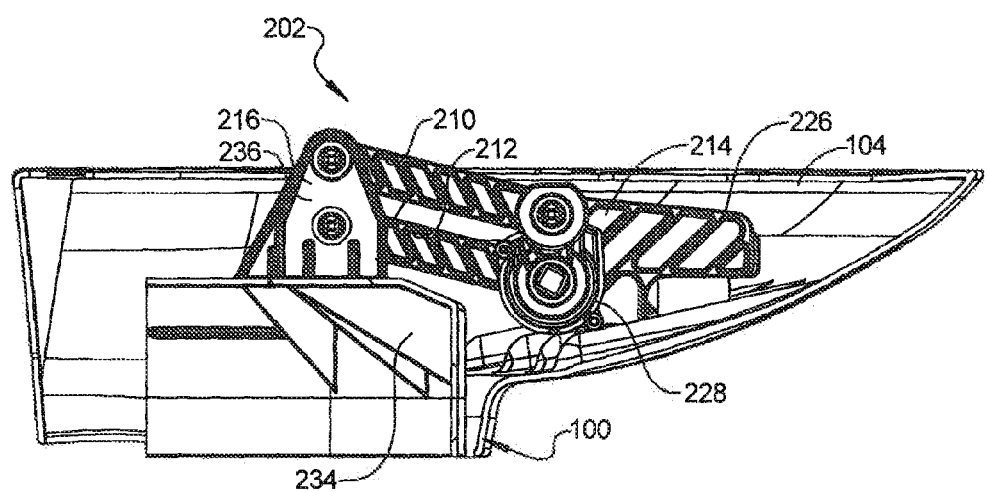
FIG. 4 is a section view of the air dam and pick-up truck similar to the section view of FIG. 3 but with the air dam in its undeployed position.

As best shown in FIGS. 3 and 4, four bar linkage 202 includes top bar 210, bottom bar 212, stanchion bar 214 and panel bar 216. Top and bottom bars 210, 212 may illustratively be rectangular in shape. Top bar 210 has opposed ends 218, 220. Bottom bar 212 has opposed ends 222, 224. Stanchion bar 214 is L shaped having top portion 226 and link portion 228. Link portion 228 includes opposed ends 230, 232. Top portion 226 of stanchion bar 214 is affixed to bumper 104, such as by bolts (not shown). It should be understood that stanchion bar 214 could be affixed to other portions of the front of the vehicle in proximity to bumper 104. Panel bar 216 is triangular in shape and includes bottom portion 234 and link portion 236. Link portion 236 includes opposed ends 238, 240. End 218 of top bar 210 is pivotally coupled to end 238 of link portion 236 of panel bar 216 and end 220 of top bar 210 is pivotally coupled to end 230 of link portion 228 of stanchion bar 214. End 224 of bottom bar 212 is pivotally coupled to end 238 of link portion 236 of panel bar 216 and end 222 of bottom bar 212 is pivotally coupled to end 232 of link portion 228 of stanchion bar 214. Bottom portion 234 of bottom bar 212 is affixed to panel 103, such as by bolts (not shown).

The four bar linkages 202 articulate to move panel 103 of air dam 100 back and up when air dam 100 is being moved by actuator 208 to its undeployed (or up) position (FIG. 4) and articulate to move panel 103 down and forward when air dam 100 is being moved by actuator 208 to its deployed (or down) position (FIG. 3). Also, when air dam 100 is in its deployed position and panel 103 hits an object such as may occur when truck 102 passes over an irregularity in a road surface, such as a pothole, four bar linkages 202 articulate to move panel 103 to move back and up in response to panel 103 hitting the object. Electric clutched actuator 208 allows actuator rod 206 to release when air dam 100 hits the object allowing panel 103 of air dam 100 to move back and up. In an aspect, when air dam 100 is in its deployed position, actuator 208 remains energized. Should panel 103 of air dam 100 be moved back and up in response to hitting an object, actuator 208 will return panel 103 of air dam 100 to its fully deployed position after it passes over the object.

Support linkages 204 provide support for panel 103 of air dam when air dam 100 is in its deployed position, but do not provide the articulation provided by four bar linkages 202. Rather, support linkages 204 follow the articulation provided by four bar linkages 202.

While three four bar linkages 202 and two support linkages 204 are shown in the exemplar embodiment of FIGS. 1-4, it should be understood that other than three four bar linkages could be used. Also, other than two support linkages 204 and in an aspect, support linkages 204 could be eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deployable air dam for an automotive vehicle, comprising:
   a panel;
   a plurality of four-bar linkages coupling the panel to beneath a front of the vehicle wherein the four bar linkages articulate to move the panel of the air dam up and back to its undeployed position and down and forward to its deployed position; and
   an electric clutched actuator coupled to the four-bar linkages for moving the panel of the air-dam between a deployed and an undeployed position wherein the panel extends vertically down from a bottom of a bumper of the vehicle when in the deployed position, the electric clutched actuator operable to permit the four-bar linkages to articulate to move the panel back and up toward its undeployed position in response to the panel hitting an object when the vehicle is traveling.

2. The deployable air dam of claim 1 wherein the four-bar linkages couple the panel to a front bumper of the vehicle.

3. The deployable air dam of claim 1 including an actuator rod coupling the electric clutched actuator to the four bar linkages, the electric clutched actuator releasing the actuator rod when the panel of the air dam hits an object when the vehicle is traveling permitting the four-bar linkages to articulate to move the panel back and up toward its undeployed position.

4. The deployable air dam of claim 1 wherein the electric clutched actuator remains energized when the panel of the air dam is in its deployed position to return the panel to its deployed position should the panel be moved back and up in response to hitting the object.

* * * * *